United States Patent [19]

Bauer

[11] 4,283,033
[45] Aug. 11, 1981

[54] APPARATUS FOR SECURING CHAIR OR TABLE COLUMNS TO THE UNDERSIDE OF CHAIR SEATS, TABLE TOPS OR THE LIKE

[75] Inventor: Fritz Bauer, Altdorf, Fed. Rep. of Germany

[73] Assignee: Suspa Federungstechnik, Fritz Bauer & Sohne oHG, Altdorf, Fed. Rep. of Germany

[21] Appl. No.: 57,754

[22] Filed: Jul. 16, 1979

[30] Foreign Application Priority Data

Aug. 22, 1978 [DE] Fed. Rep. of Germany ....... 2836666

[51] Int. Cl.³ ............................................. F16M 11/16
[52] U.S. Cl. ................................... 248/188; 108/156; 403/196
[58] Field of Search ............... 248/631, 622, 623, 188, 248/188.1; 24/263 B, 263 CA; 403/196, 240, 256, 257; 108/156

[56] References Cited

U.S. PATENT DOCUMENTS

| 2,173,355 | 9/1939 | Criswell | 24/263 CA |
|---|---|---|---|
| 2,954,638 | 10/1960 | Motter | 108/156 X |
| 3,017,153 | 1/1962 | Johnson | 248/188 X |
| 3,265,342 | 8/1966 | Brettner | 248/188 |
| 3,656,593 | 4/1972 | Bauer . | |
| 3,711,054 | 1/1973 | Bauer . | |
| 3,790,119 | 2/1974 | Bauer . | |
| 3,963,101 | 6/1976 | Bauer . | |
| 3,966,182 | 6/1976 | Stadelmann . | |
| 3,995,824 | 12/1976 | Bauer | 248/631 |
| 4,093,196 | 6/1978 | Bauer . | |
| 4,132,178 | 1/1979 | Mueller | 248/188 |

FOREIGN PATENT DOCUMENTS

| 37192 | 1/1936 | Netherlands | 248/188 |
|---|---|---|---|
| 220567 | 3/1968 | Sweden | 108/156 |

Primary Examiner—J. Franklin Foss
Attorney, Agent, or Firm—Browdy and Neimark

[57] ABSTRACT

A securing device for releasably attaching the columns or legs of chairs, tables and the like. The securing device is fixedly mounted to the underside of the chair seat or table top and includes a receiver in which the column or leg is inserted. A gripper shoe can be advanced radially against the column to hold it in place. The radial displacement of the gripper shoe is caused by the force exerted by an eccentric stack of discs of different size which are assembled into an integral body that is rotated about an axis, thereby forcing the larger eccentric discs into camming engagement with mating extensions of the gripper shoe. Upon release of the eccentric, the column may be pushed out of its receiver by the upward motion of a handle which pivots about a ball joint resting on the eccentric body and exerts an axial downward force on the column to be removed.

6 Claims, 3 Drawing Figures

APPARATUS FOR SECURING CHAIR OR TABLE COLUMNS TO THE UNDERSIDE OF CHAIR SEATS, TABLE TOPS OR THE LIKE

FIELD OF THE INVENTION

The invention relates to furniture, e.g. chairs, tables and the like. More particularly, the invention relates to the attachment of columns, legs etc. to chair and table tops by means of a securing device mounted at the underside of the chair or table top and including a gripper shoe for holding the column or leg in place.

BACKGROUND OF THE INVENTION

In an apparatus known from U.S. Pat. No. 3,995,824, a gripper device has an inclined surface which slides over a mating surface with the same angle of inclination, that is, about 5°. When this gripper device is displaced approximately parallel to the column or leg by means of a tensioning bolt, the gripping surface of the gripper device nearest the column either approaches closer to the column or recedes from it. As a result, the column can be held tightly but releasably, in a bore of the securing device or in the hub of the securing device containing this bore. In principle, a securing device of this kind is easily accessible for adjustment and provides an absolutely reliable mount for the column, especially in the case of columns which are entirely cylindrical in the area where they are gripped. However, the manufacture of this device, particularly due to the inclined surfaces, is relatively expensive; furthermore, in order to execute a purely radial gripping effect, the device also makes axial movements in relationship to the column. Finally, the application or release of the gripping action is made by means of tensioning bolt and requires a relatively high amount of labor.

U.S. Pat. No. 3,790,119, describes the formation of a fastening cone at the upper end of a gas spring which is adjustable in length and forms part of the column and which has an upper valve arrangement and a valve rod protruding at the top. The cone is inserted into a corresponding conical bore of a securing element attached to the chair or table surface. Conical connections of this kind demand extremely high manufacturing precision, because, if the opening angles of the two cones do not coincide exactly, the connection will wobble; at the same time, if the seat fits exactly, the connection will after some time, become very difficult to release. Because the opening angles of these cones are very small, diametrical tolerances in the range of a few hundredths or a millimeter result in relative displacements between the column and the securing element which are in the millimeter range. When an operating lever is provided for the valves on the securing device, such displacements can cause the valve to be under continuous stress due to the operating lever, and fail to close tightly. In other words, very small diametrical variations of the cone and the conical bore can make the lengthwise adjustment capacity useless in order to prevent this or compensate for it, every operating lever must be adjusted by hand. It is also conceivable to compensate for such disadvantages by means of an overly large amount of play in the operating lever; however, the operating lever will then be free to wobble below the chair seat, table top or the like.

OBJECT AND SUMMARY OF THE INVENTION

Hence, it is a fundamental object of the invention to provide an apparatus for attaching legs, columns etc. to the undersides of tables or chairs which is relatively inexpensive in structure and manufacture and requires only a minor effort for adjustment.

This object is attained by providing a securing device with an eccentric body pivotable about an axis, supported on one side by a gripper shoe and on the other side by a wall of the securing device.

The eccentric body must be rotated by at most 180° but frequently by less than 180° in order to be brought from a fully released position of the gripper show into a position representing maximum gripping action with request to the column. The expense of assembly and disassembly can thus be kept extremely low, because only cylindrical surfaces and portions of cylindrical surfaces are required and these can be manufactured at low cost yet with high precision. In a particularly preferred embodiment the eccentric body consists of alternating discs of different diameter. Thus, a fully symmetrical exertion of force on the part of the gripper shoe is assured, because it bears with uniform pressure against the surface of the column wall associated with it. In addition, the manufacture of an eccentric body of this kind, formed solely of cylindrical discs, is extraordinarily simple, because only two lathe insertions are required.

A hexagonal bore in the eccentric body provides a simply way to pivot it.

BRIEF DESCRIPTION OF THE DRAWINGS

Further advantages and features of the invention will follow from the description of a sample embodiment with reference to the drawings, wherein.

DESCRIPTION OF THE PREFERRED EMBODIMENT

Figure 1:
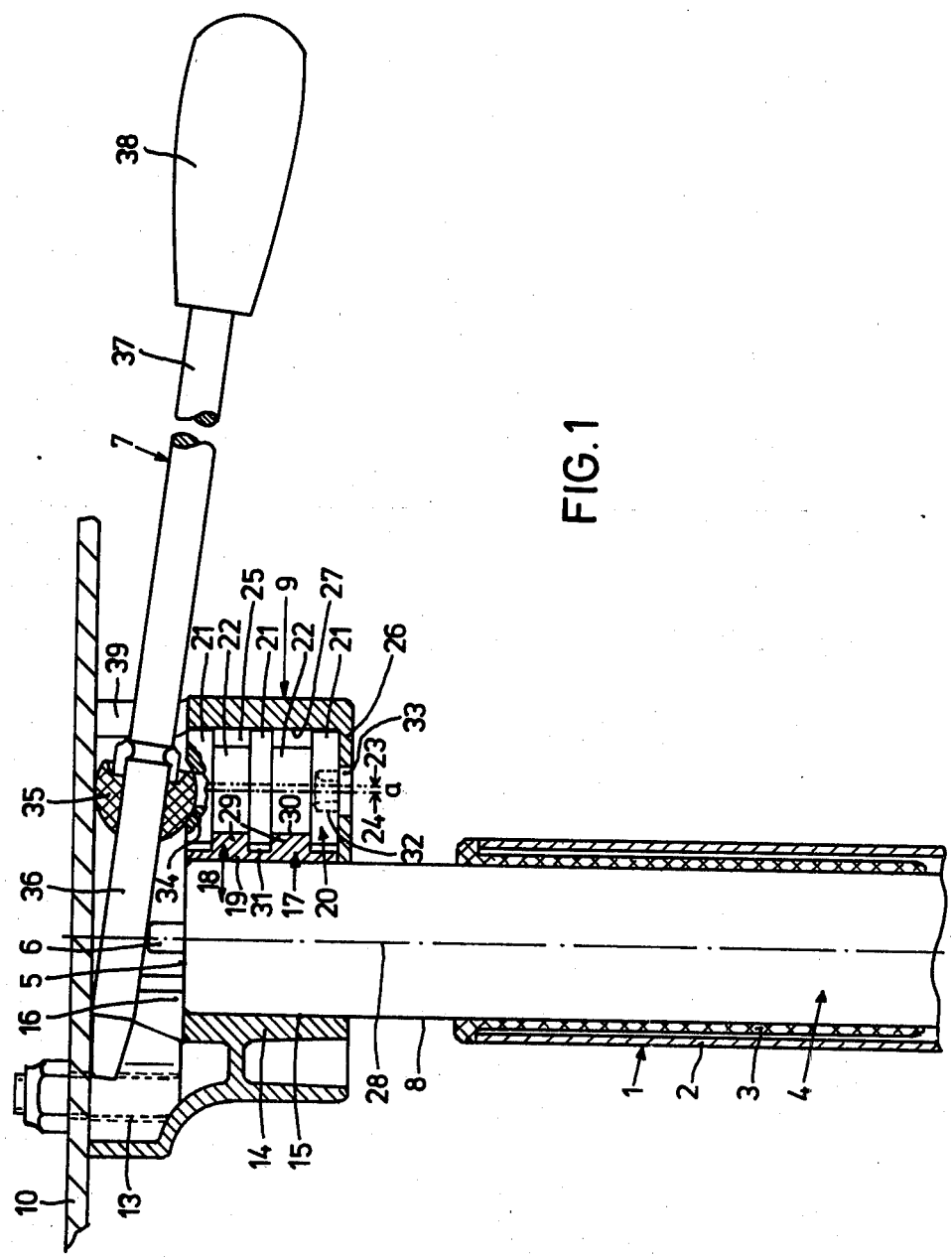
FIG. 1 shows the upper portion of a chair or table column equipped with an apparatus in accordance with the invention in vertical longitudinal section, a gripper shoe being shown pressed against the column.

A chair or table column 1, of which only the upper portion is shown, substantially comprises a guide tube 2, which is provided in its upper portion with a guide sleeve 3 made of a plastic having good sliding characteristics which respect to metal, and a lengthwise-adjustable pneumatic or hydropneumatic lifting device 4, which is also known under the general designation of "lengthwise-adjustable gas spring". The structure and mode of operation of this lifting device 4 is known from U.S. Pat. No. 3,656,593; U.S. Pat. No. 3,966,182; U.S. Pat. No. 3,963,101; U.S. Pat. No. 4,093,196. The structure of a chair or table column 1 of this kind is known in detail from the U.S. Pat. No. 3,711,054. As is conventional in these lifting devices, an actuation pin 6 protrudes from an end face 5 and can be displaced into a cylindrical housing 8 of the lifting device 4 by a valve device attached to the housing 8 and opened by an operching lever 7.

The lifting device 4 is attached at its upper end to the underside of a chair seat or table top 10 by means of a securing device 9. This securing device has an approximately square shape. On the four outside corners, sleeves 11 have vetical bores 12 for receiving screws 13, by means of which the securing device 9 is attached to the chair seat or table top 10. Approximately in the center of the securing device 9, there is a hub 14 with a cylindrical bore 15 of a diameter approximately identical to, or very slightly larger than, that of the cylindrical housing 8 of the lifting device 4, so that the upper end of the lifting device 4 can be inserted into this hub 14 of the securing device 9. The sleeves 11 and the hub 14 in the center are connected by a relatively large number of ribs, some of which are indicated by the references numeral 15a so that the entire securing device, which is embodied as a die-casting, is a very strong and rigid, but relatively light, structural part.

Two ribs 15a are provided with a section 16 extending across the bore 15 and serving as a stop for the end face 5 of the housing 8 of the lifting device 4, so that its axial position is also fixed exactly relative to the securing device by inserting the housing 8 from below into the bore 15 up to the stop 16.

Figure 3:
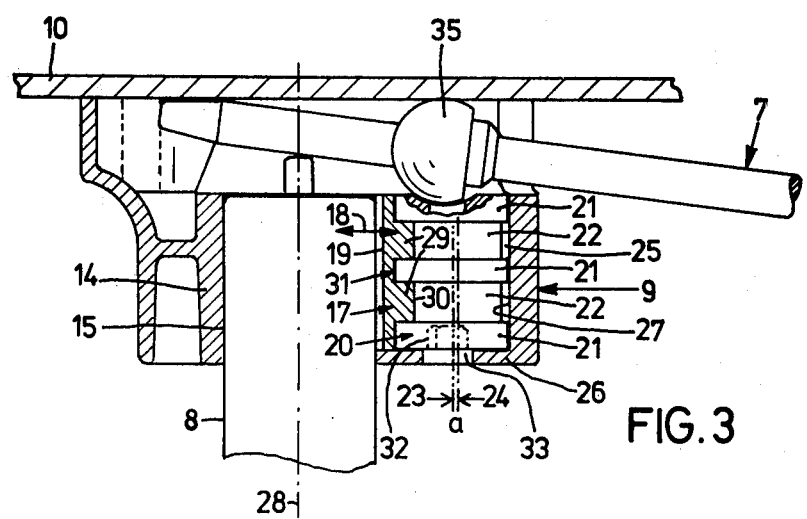
FIG. 3 is a detail of FIG. 1, showing the gripper shoe in the released position.

A gripping or clamping shoe 17 is located in the securing device 9 and is horizontally displaceable in the direction indicated by the double-headed arrow 18. Its gripping surface 19, in the form of a section of a cylinder whose diameter is identical to that of the housing 8 can be pressed against the associated surface portion of the housing 8, as a result of which the lifting device 4 is held fast in the hub 14 and thus also in the securing device 9. The gripper shoe 17 is pressed against the associated surface of the housing 8 by means of an eccentric body 20' the eccentric body 20 is composed of alternately adjacent cylindrical discs 21 and 22, the cylindrical discs 21 having a large diameter than the cylindrical discs 22. As shown in FIG. 3, the cylindrical discs 21, are all identical and are disposed coaxially with respect to one another. Their axis 23 is indicated in the drawing by the line consisting of a series of two dots and two dashes.

The cylindrical discs 22 of smaller diameter (but also identical among themselves)—are also disposed coaxially with respect to one another, with their axis 24 indicated in the drawing by a line of alternating single dots and dashes. It is an express feature of the invention that the two axes 23 and 24 do not coincide, but lie parallel to one another at a distance "a" which is approximately 1/10 to 1/30 of the diameter of the cylindrical discs 21. In the present instance, this eccentricity "a" of the parallel axes 23, 24 amounts to approximately 1 mm, with the diameter of the discs 21 being approximately 20 mm and that of the discs 22 being approximately 15 mm.

The gripper shoe 17 and the eccentric body 20 are disposed in a recess 25 of the securing device 9 which is open at the top but substantially closed at the bottom by a bottom surface 26. The vertical wall 27 of the recess 25 opposite the gripper shoe 17 is approximately semi-cylindrical, with a diameter equal to that of the larger cylindrical discs 21 so that the eccentric body 20, composed as one piece of the cylindrical discs 21, 22, bears against the wall 27 with the peripheral cylindrical surface of the discs 21 and is held against them by a force acting perpendicular to the longitudinal axis 28 of the housing 8 and thus in the direction of the arrow 18.

On its side near the eccentric body 20, the gripper shoe has extensions 29 in the form of annular cylindrical sections, whose radius is approximately equal to the radius of the smaller cylindrical discs 22 and their arrangement and extension in the direction of the axes 23, 24 are such that their pressure surfaces 30 are oriented toward the cylindrical discs 22 and bear or can bear against them. Between and alongside the two extensions 29 lie recesses 31 into which the larger cylindrical discs 21 protrude without radial contact whenever the eccentric body 20 is in a position—as shown in FIG. 1—in which the gripper shoe device 17 is being pressed against the housing 8.

In the region of the two axes 23, 24, that is, approximately in the center of the eccentric body 20, there is disposed a blind hexagonal bore 32 extending in the longitudinal direction of the body 20. The bore 32 is accessible from the outside through a corresponding opening 33 of larger diameter in the bottom surface 26, so that the eccentric body 20 can be rotated by means of a hexagonal wrench (Allen wrench) inserted into the bore 32 from below.

The lifting device 4 is gripped within the securing device 9 as follows:

To permit insertion of the housing 8 into the bore 15 of the hub 14, the gripper shoe 17 must be in a radially remote position with respect to the longitudinal axis 28. To this end, the eccentric body 20 is rotated into the position shown in FIG. 3, in which the axis 24 of the cylindrical discs 22 is located between the axis 23 and the wall 27. The peripheral surface of the cylindrical discs 22 facing the pressure surfaces 30 of the extensions 29 are then close as possible to the opposite wall 27, so that the gripper shoe 17 can be moved as close the wall 27 as possible. After inserting the upper end of the housing 8 into the bore 15 in the manner described, the eccentric body 20 is rotated about the axis 23 by means of the hexagonal wrench. This rotation does not change the relative spatial position of the axis 23 but pivots the cylindrical discs 22 which are disposed eccentrically with respect to the axis 23, so that the gripper shoe 17 is pressed in the direction of the double-headed arrow 18 toward the longitudinal axis 28 of the housing 8, i.e. it is pressed against the upper cylindrical wall portion which faces it. The direction in which the eccentric body 20 is rotated is of no significance. In either case, the grip is released by rotating in the opposite direction.

Figure 2:
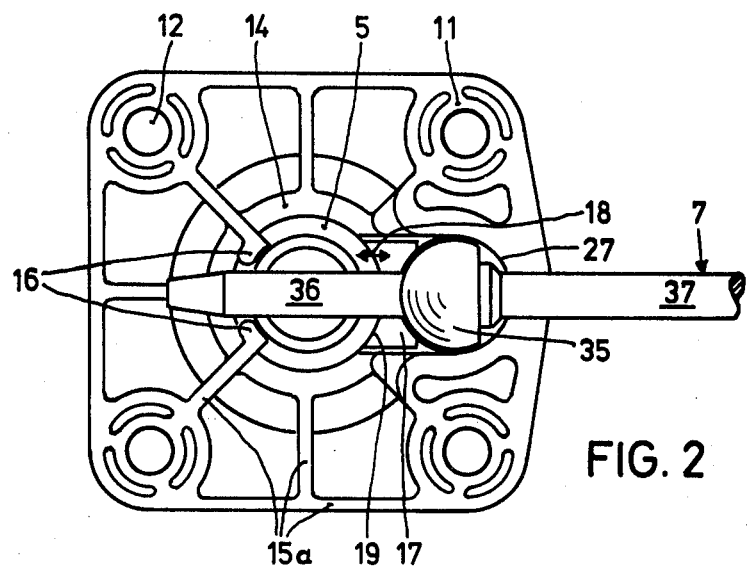
FIG. 2 is a plan view of the apparatus.

In the upper side of the eccentric body 20, there is a recess 34 in the form of a portion of a sphere, in which is supported an approximately spherical bearing 35 to which is attached a rod-like operating lever 7. The operating lever 7 is divided by this bearing 35 into an inner postion 35 and an outer portion 37. The free end of the outer portion 37 supplies a handle 38 (FIG. 1). The inner portion 36 can contact the top of an actuation pin 6 but is normally supported at its free end against the underside of the seat or table top 10. The top of the bearing 35 is also held against the underside of the seat or table top 10. The outer portion 37 of the operating lever 7 is carried to the outside through an opening 39, open at the top, in the securing device 9. During assembly the operating lever 7 is simply placed in the securing device from above before attachment to the chair seat or table top; it is then fixed in place when the connection between the securing device 9 and the seat or top 10 is established. The operating lever 7 is prevented from pivoting about the axis 23 because the inner portion 36, is guide between the two sections 16 which act as stops, as may be seen from FIG. 2. These stops preclude significant pivoting movements about the axis 23.

As also seen from FIG. 1, the eccentric body 20, and the gripper shoe 17 can be simply inserted from above into the recess 25 before the attachement of the securing device 9 to the underside of the seat or top 10, after which the operating lever 7 with its bearing 35 is emplaced. The eccentric body 20 and the gripper shoe 17 are thus simultaneously held in place by the operating lever 7; however, this is of significance only when the grip between the gripper shoe 17 and the housing 8 is released. When the gripping action has been established, all movements parallel to the axis 28 are precluded.

It will be obvious to those skilled in the art that various changes may be made without departing from the scope of the invention and the invention is not considered to be limited to what is shown in the drawings and described in the specification.

What is claimed is:

1. In an apparatus for securing chair or table columns or the like to the underside of chair seats, table tops or the like, said apparatus including a securing device capable of attachment to the underside of the chair seat or table top or the like and having a bore for receiving the upper end of said column, said securing device including a gripper shoe which is radially displaceable with respect to the column and can be pressed against the column, thereby immobilizing the column with respect to said securing device, the improvement wherein said securing device includes an eccentric body disposed on the side of said gripper shoe remote from said column, said eccentric body being pivotable about an axis and bearing on one side against said gripper shoe and on the other side against a wall of the securing device, and wherein said eccentric body is fixed at the top by means of a bearing assembly disposed between said eccentric body and said chair seat or table top and extending into a pivotable operating lever.

2. An apparatus in accordance with claim 1 wherein said eccentric body comprises a stack of cylindrical discs of different diameters disposed in alternation, each set of identical cylindrical discs being disposed coaxially with respect to one another, thereby defining two axes associated respectively, with said two sets of cylindrical discs and extending parallel to one another but spaced apart by a distance, and wherein, in the gripped state of said column, the cylindrical discs of one set bar against said gripper shoe while the cylindrical discs of the other set are supported by said wall.

3. An apparatus in accordance with claim 2, wherein the cylincrical discs having the larger diameter bear against said wall which is embodied as a cylindrical section and the cylindrical discs having the smaller diameter bear against mating extensions of said gripper shoe.

4. An appratus in accordance with claim 1 or 2 wherein said eccentric body in a single intergral piece.

5. An apparatus in accordance with claim 1 wherein said eccentric body is provided with a central hexagonal blind bore accessible from the outside of said securing device.

6. An apparatus in accordance with claim 1 wherein said bearing assembly is supported in a partially spherical recess in the upper side of said eccentric body.

* * * * *